(12) United States Patent
Lund et al.

(10) Patent No.: US 12,520,996 B2
(45) Date of Patent: Jan. 13, 2026

(54) BRAKING MECHANISM FOR A ROTARY OPERATING MEMBER OF A MEDICAL DEVICE

(71) Applicant: AMBU A/S, Ballerup (DK)

(72) Inventors: Jesper Grøndahl Lund, Værløse (DK); Bjørn Bruhn Thomsen, Birkerød (DK)

(73) Assignee: AMBU A/S, Ballerup (DK)

( * ) Notice: Subject to any disclaimer, the term of this patent is extended or adjusted under 35 U.S.C. 154(b) by 481 days.

(21) Appl. No.: 17/920,322

(22) PCT Filed: Apr. 21, 2021

(86) PCT No.: PCT/DK2021/050117
§ 371 (c)(1),
(2) Date: Oct. 20, 2022

(87) PCT Pub. No.: WO2021/213600
PCT Pub. Date: Oct. 28, 2021

(65) Prior Publication Data
US 2023/0172439 A1    Jun. 8, 2023

(30) Foreign Application Priority Data
Apr. 24, 2020    (DK) .......................... PA 2020 70258

(51) Int. Cl.
*A61B 1/00* (2006.01)
*A61B 1/005* (2006.01)
(52) U.S. Cl.
CPC ...... *A61B 1/00066* (2013.01); *A61B 1/00042* (2022.02); *A61B 1/0052* (2013.01)

(58) Field of Classification Search
CPC ............ A61B 1/00066; A61B 1/00098; A61B 1/0052
See application file for complete search history.

(56) References Cited

U.S. PATENT DOCUMENTS 4,461,282 A    7/1984  Ouchi
4,742,816 A *  5/1988  Suzuki ................. A61B 1/0052
                                                    600/134
(Continued)

FOREIGN PATENT DOCUMENTS

CN    106880332 A    6/2017
DE    102010037894 A1    3/2011
(Continued)

OTHER PUBLICATIONS

International Search Report and Written Opinion in PCT/DK2021/050117 dated Aug. 2, 2021, 9 pages.
(Continued)

*Primary Examiner* — Michael J Carey
*Assistant Examiner* — Stephen Floyd London
(74) *Attorney, Agent, or Firm* — Faegre Drinker Biddle & Reath LLP (57) ABSTRACT

A braking mechanism for a rotary operating member (9) of a medical device such as an endoscope. The braking mechanism includes at least one elastic member (18) adapted for biasing a friction element (19) into a frictional engagement between a stationary shaft arranged on the endoscope handle and the rotary operating member (9). The friction element (19) includes a curved surface and the elastic member (18) comprises a spring which, as seen in the radial direction of the rotary member (9), has a cross-sectional shape with at least one U-shaped section.

14 Claims, 8 Drawing Sheets

(56) References Cited

U.S. PATENT DOCUMENTS

| | | | |
|---|---|---|---|
| 4,924,852 A * | 5/1990 | Suzuki | A61B 1/0052 600/150 |
| 5,007,406 A | 4/1991 | Takahashi et al. | |
| 5,014,685 A | 5/1991 | Takahashi | |
| 5,569,157 A | 10/1996 | Nakazawa et al. | |
| 5,575,755 A * | 11/1996 | Krauter | A61B 1/0052 600/149 |
| 5,707,344 A | 1/1998 | Nakazawa et al. | |
| 5,762,067 A | 6/1998 | Dunham et al. | |
| 6,440,062 B1 * | 8/2002 | Ouchi | A61B 1/00098 600/146 |
| 6,673,012 B2 | 1/2004 | Fujii et al. | |
| 6,699,183 B1 * | 3/2004 | Wimmer | A61B 1/0057 600/149 |
| 7,828,725 B2 | 11/2010 | Maruyama | |
| 7,914,440 B2 | 3/2011 | Otawara | |
| 8,840,543 B2 | 9/2014 | Deng et al. | |
| 8,845,521 B2 | 9/2014 | Maruyama | |
| 8,911,362 B2 | 12/2014 | Kaneko | |
| 9,089,262 B2 | 7/2015 | Hashiba | |
| 9,089,263 B2 | 7/2015 | Maruyama | |
| 9,192,283 B2 | 11/2015 | Fujitani | |
| 2001/0037051 A1 * | 11/2001 | Fujii | A61B 1/0052 600/146 |
| 2007/0232857 A1 * | 10/2007 | Otawara | A61B 1/00177 600/129 |
| 2007/0255102 A1 * | 11/2007 | Maruyama | A61B 1/0057 600/149 |
| 2011/0077461 A1 | 3/2011 | Maruyama | |
| 2011/0088498 A1 * | 4/2011 | Ettwein | A61M 25/0136 74/479.01 |
| 2013/0204096 A1 | 8/2013 | Ku et al. | |
| 2014/0200402 A1 | 7/2014 | Snoke et al. | |
| 2014/0371534 A1 | 12/2014 | Okamoto | |
| 2015/0148598 A1 * | 5/2015 | Fukushima | A61B 1/00098 600/109 |
| 2016/0089125 A1 * | 3/2016 | Morimoto | A61B 1/00098 600/107 |
| 2017/0000316 A1 * | 1/2017 | Sueyasu | A61B 1/00098 |
| 2020/0214544 A1 * | 7/2020 | Harada | A61B 1/018 |
| 2021/0007582 A1 * | 1/2021 | Graveley | A61B 1/0055 |
| 2021/0315445 A1 * | 10/2021 | Wilder | A61B 1/0058 |
| 2023/0148844 A1 | 5/2023 | Christensen et al. | |
| 2023/0157519 A1 | 5/2023 | Thomsen et al. | |
| 2023/0165436 A1 | 6/2023 | Lund et al. | |
| 2023/0233067 A1 | 7/2023 | Und et al. | |

FOREIGN PATENT DOCUMENTS

| | | |
|---|---|---|
| EP | 0 165 718 A2 | 12/1985 |
| JP | 07-148104 A | 6/1995 |
| JP | 2011-050643 A | 3/2011 |

OTHER PUBLICATIONS

Examination Report issued in European Application No. 21725024.0, mailed on Aug. 8, 2025, 5 pages.

First technical examination report in Danish patent application PA 2020 70258 dated Aug. 18, 2020, 7 pages.

* cited by examiner

# BRAKING MECHANISM FOR A ROTARY OPERATING MEMBER OF A MEDICAL DEVICE

CROSS REFERENCE TO RELATED APPLICATIONS

This application is a National Stage entry under 35 U.S.C. § 371 of International Application No. PCT/DK2021/050117, filed Apr. 21, 2021, which claims priority from and the benefit of Danish Patent Application No. PA 2020 70258, filed Apr. 24, 2020; said applications are incorporated by reference herein in their entirety.

TECHNICAL FIELD

The present disclosure relates medical devices such as endoscopes, more specifically but not exclusively a duodenoscope, and in particular to a braking mechanism for a rotary operating member of an endoscope for ensuring certain and reliable operation of an operating lever.

RELATED ART

A duodenoscope is a flexible endoscope configured to access a patient's duodenum from the stomach via the patient's mouth. When the tip of the insertion tube is positioned in the duodenum there is a need to guide a tool radially from the tip, e.g. towards the biliary ducts in the wall of the duodenum. For that purpose the camera and the exit of a working channel of a duodenoscope is, unlike many other types of endoscopes, not positioned at the end surface of the distal tip. Moreover, in order to accommodate different needs for guiding the tool the exit port of the working channel is provided with a lever that is operated by pulling and pushing a wire connected to an operating member at the endoscope handle. The lever or tool lift is also known as an Albarran mechanism from the original inventor. An example of such an endoscope is known from U.S. Pat. No. 9,089,263, incorporated herein by reference.

U.S. Pat. No. 9,089,263 explains the need of incorporating a brake mechanism in conjunction with the operating lever in order for the brake lever and hence the tool lift to maintain position even if the operator removes the finger used for the operation from the operating lever. In this respect U.S. Pat. No. 9,089,263 disclosed braking mechanisms using leaf springs, which appear to be metal springs riveted onto the operating lever are used for the braking mechanisms. The braking mechanisms of U.S. Pat. No. 9,089,263 which are located within the handle housing aim at balancing static friction force against dynamic friction force. That is to say, maintaining a high static friction force while obtaining a reduced dynamic friction force.

However, in order to fine tune the position of the operating lever in the desired position the operator needs some tactile feedback from the operating member. Friction in the entire kinematic chain from the operating lever to the tool lift may exhibit sufficient friction to provide such tactile feedback to the operator, but this is not necessarily always so, and additional friction may be needed. In this respect the aim of reducing the dynamic friction as suggested in U.S. Pat. No. 9,089,263 is counterproductive.

Moreover, with the current trend of endoscopes and in particular duodenoscopes going towards single use endoscopes, i.e. endoscopes that are adapted to be disposed of after the use with a single patient, rather than multiple use endoscopes that have to be cleaned and sterilized, the manufacturing costs of the endoscopes have to be kept down. In this respect the rather complex braking mechanisms suggested in U.S. Pat. No. 9,089,263 renders themselves rather poorly for single use.

BRIEF DESCRIPTION OF THE DISCLOSURE

Based on this background it is the object of the present disclosure to provide a friction mechanism for an operating lever of an endoscope.

According to a first aspect of the disclosure this object is achieved by a braking mechanism for a rotary operating member of a medical device, such as an endoscope, wherein the braking mechanism comprises at least one elastic member adapted for biasing a friction element into a frictional engagement between a stationary shaft arranged on the medical device housing and the rotary operating member, where said friction element comprises a curved surface, characterized in that said elastic member comprises a spring which, as seen in the radial direction of the rotary member, has a cross-sectional shape with at least one U-shaped section.

With such a spring configuration the number of parts that need to be manufactured and assembled in the manufacturing process is much reduced in turn reducing the manufacturing costs for the medical device.

This is in particular the case when, according to a first preferred embodiment of the first aspect of the disclosure, the elastic member is provided integrally with said rotary operating member. This integration allows the operating member with the springs and the braking to be moulded as one single item of a suitable plastic material, e.g. by injection moulding.

According to a further preferred embodiment of the first aspect of the disclosure, the curved surface of said friction element comprises a circle sector with a predetermined radius. Having a large circle sector surface that matches the outer radius of the counterpart of the braking mechanism, which the curved surface engages, smooths out the friction, because the pressure is reduced and so the tendency to catch on the surface as the surface area grows larger.

According to yet a further preferred embodiment of the first aspect of the disclosure, the stationary shaft arranged on the medical device housing comprises a cylindrical part with a radius matching said predetermined radius of said curved surface. Thus, the entire braking mechanism is essentially only two parts, viz. the shaft, which is preferably formed integrally with a shell part of the endoscope handle, and the integrally moulded operating member.

According to another preferred embodiment, the braking mechanism comprises at least two, more preferred at least six friction elements and most preferred at least twelve friction elements. A large number of braking elements aid in the smooth motion, i.e. smoothing out the friction, but evidently the number should not be too large, as it increases complexity of the operating member and hence the manufacturing costs.

According to a second aspect of the disclosure the object is achieved by a medical device comprising a braking mechanism according to the first aspect of the disclosure.

According to a preferred embodiment of the second aspect of the disclosure, the medical device is an endoscope. Endoscopes generally have operating knobs, and the braking mechanism therefore renders itself for the use in manufacturing of endoscopes, in particular disposable endoscopes, this is in particular the case when, according to a further preferred embodiment the braking mechanism is arranged on a handle.

According to a third aspect of the disclosure, the object is achieved by a system comprising a medical device according to the second aspect and a display unit.

BRIEF DESCRIPTION OF THE FIGURES

The disclosure will now be made in greater detail based on non-limiting exemplary drawings and with reference to the schematic drawings on which.

DETAILED DESCRIPTION

Figure 1:
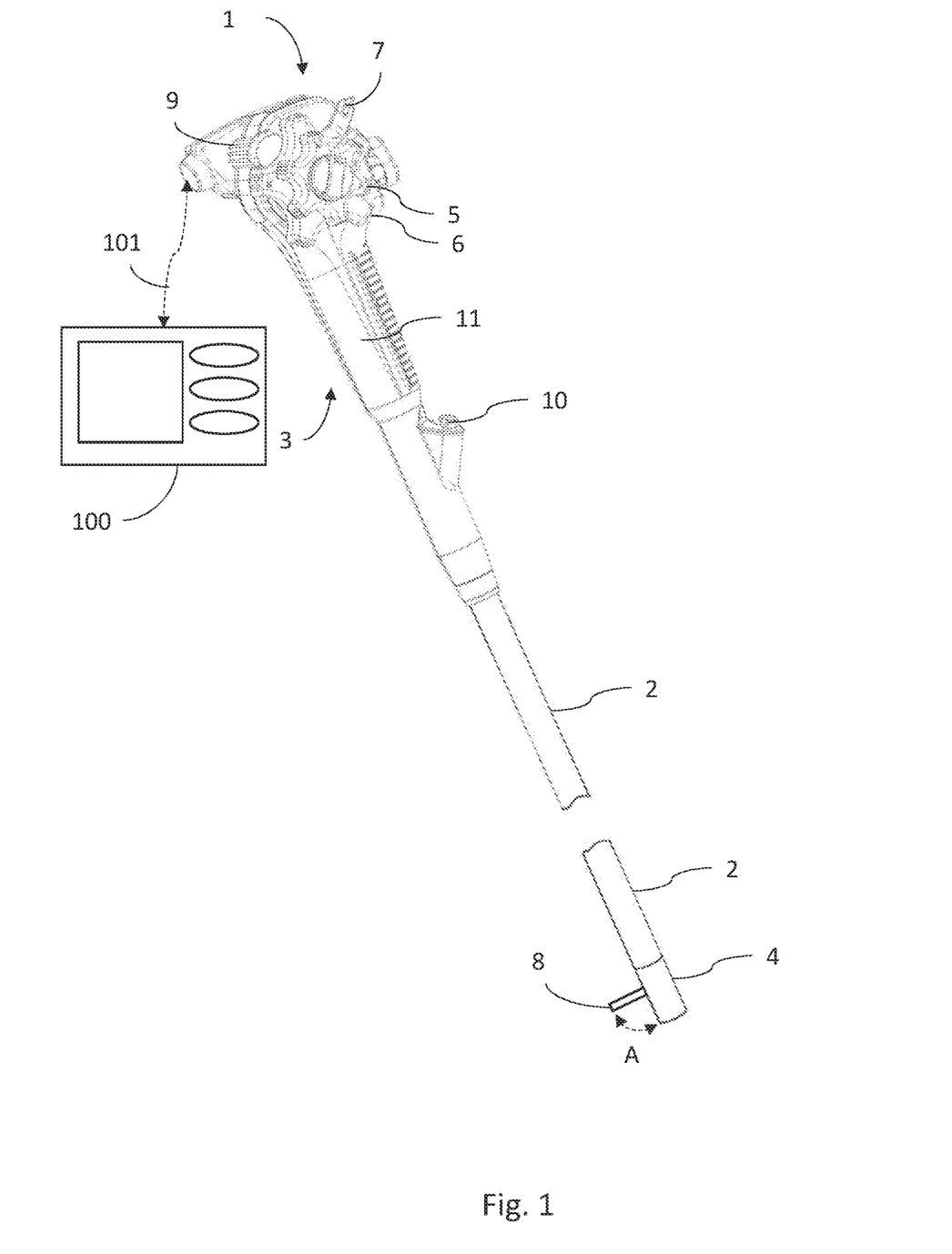
FIG. 1 schematically shows a system comprising a display unit and a medical device exemplified as an endoscope, in particular a duodenoscope.

Turning first to FIG. 1 a medical device in the form of an endoscope 1, in particular exemplified by a duodenoscope, is schematically shown. The endoscope 1 is adapted to form part of a system also comprising a display device 100, connectable to the endoscope 1 via a cable 101 or wireless communication. The endoscope comprises an elongate insertion tube 2 (interrupted for illustration purposes) extending from the distal end of the handle 3 of the endoscope 1. At the distal end of the insertion tube 2 an articulated bending section 4 is provided. The articulated bending section 4 may be controlled in two orthogonal planes by means of a first operating knob 5 and a second operating knob 6 both arranged coaxially at or close to the proximal end of the handle 3. Both the first knob 5 and the second knob 6 are adapted to be operated by the one or more fingers of an operator. Furthermore, a locking or arresting mechanism controlled by a locking lever 7 is also coaxially arranged. The locking lever 7 allows the first knob 5 and the second knob 6 to be locked in position with respect to the handle 3 thereby allowing the bending section 4 to be kept in a desired bending configuration even if the operator lets go of the first knob 5 and or the second knob 6.

As mentioned, when, as exemplified, the endoscope 1 is a duodenoscope it may further comprise a tool lift 8, often referred to as Albarran lever after the original inventor. The tool lift 8 is essentially an arm that may be swung laterally to an angle from the bending section 4. This swing movement, as illustrated by the double arrow A in FIG. 1, is controlled by a further tool lift control knob 9 arranged together with locking lever 7, the first knob 5 and the second knob 6, preferably also coaxially therewith. The tool lift 8 thereby allows a tool (not shown) inserted through the tool entry port 10 in the handle 3 to be diverted laterally from the insertion tube 2, e.g. into the biliary ducts from the duodenum.

Inter alia because the biliary ducts are very narrow where the exit in the wall of the duodenum, good and smooth control of the tool lift 8 is desirable.

Figure 2:
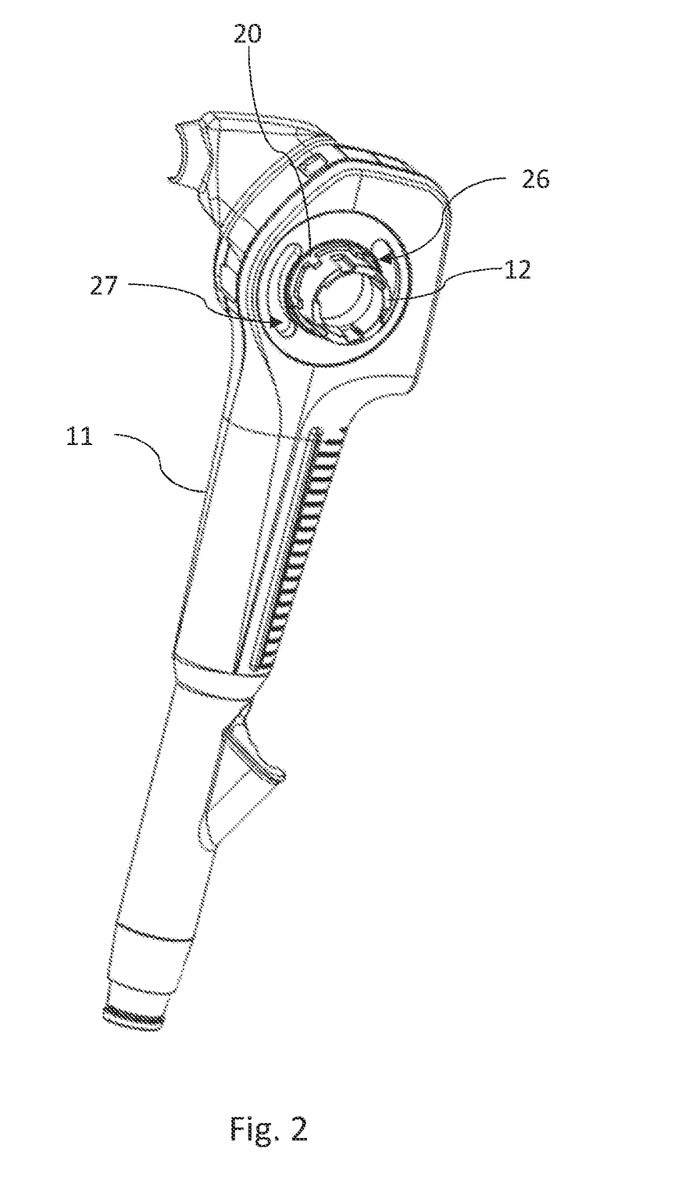
FIG. 2 shows one shell-shaped housing part of the handle of the endoscope of FIG. 1.
Figure 3:
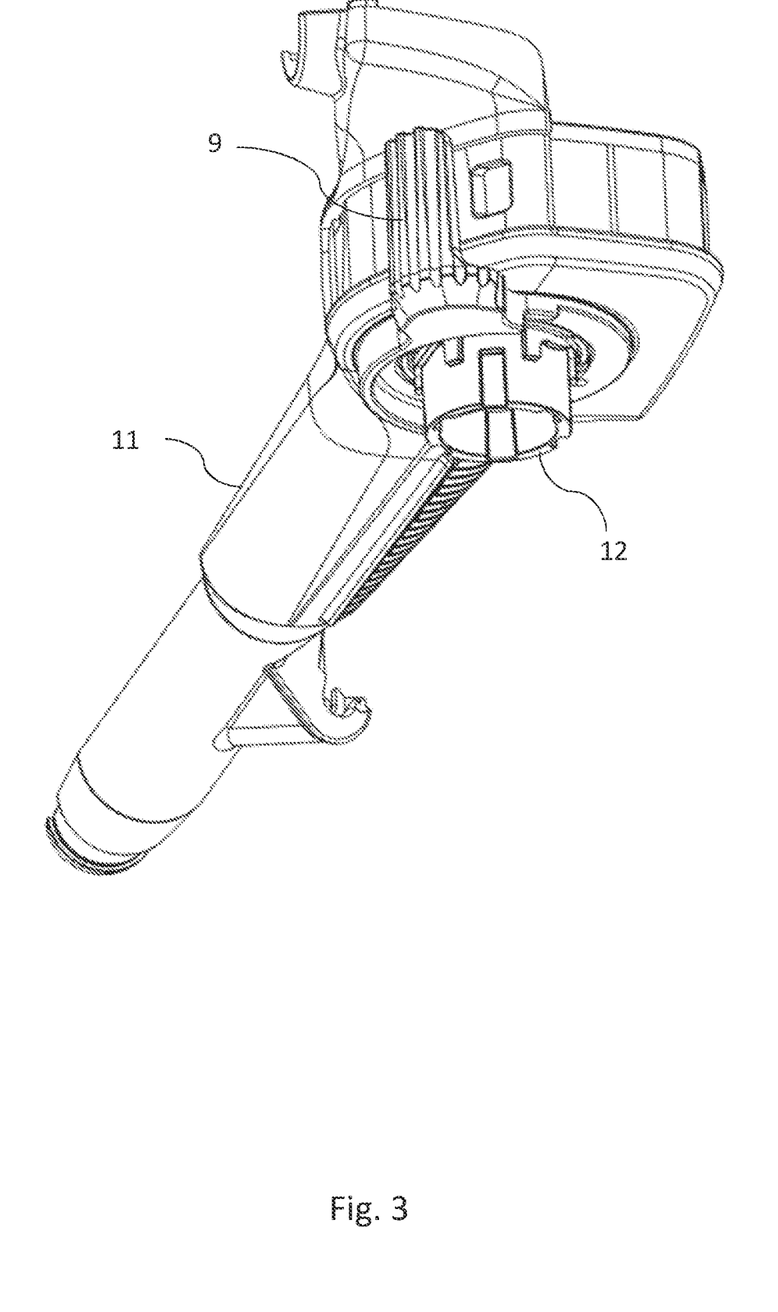
FIG. 3 shows an operating member mounted on the shell-shaped housing part of FIG. 2.

Turning now to FIG. 2 a first shell-shaped housing part 11 of the handle 3. Together with a complementary second shell-shaped housing part form a housing of the medical device exemplified by the duodenoscope, where the housing doubles as the handle 3. The shell-shaped housing part 11, as shown, is preferably moulded in one single integral piece from a suitable plastic material. The shell-shaped housing part 11 comprises a hollow shaft 12 on which the tool lift control knob 9, the locking lever 7, the first knob 5 and the second knob 6 are mounted in that order during assembly in a coaxial and rotary manner, i.e. starting with the tool lift control knob 9 as shown in FIG. 3.

Figure 4:
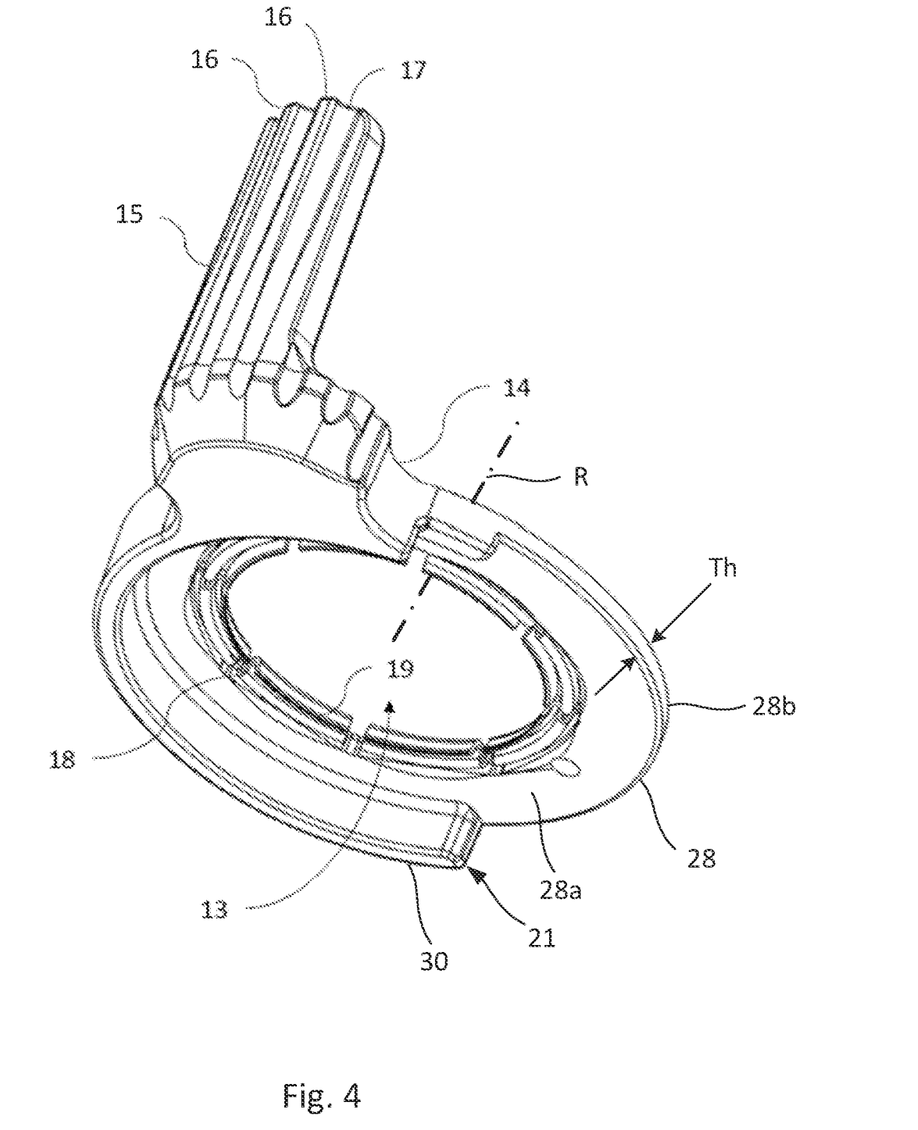
FIG. 4 shows a first isometric view of the operating member of FIG. 3.
Figure 5:
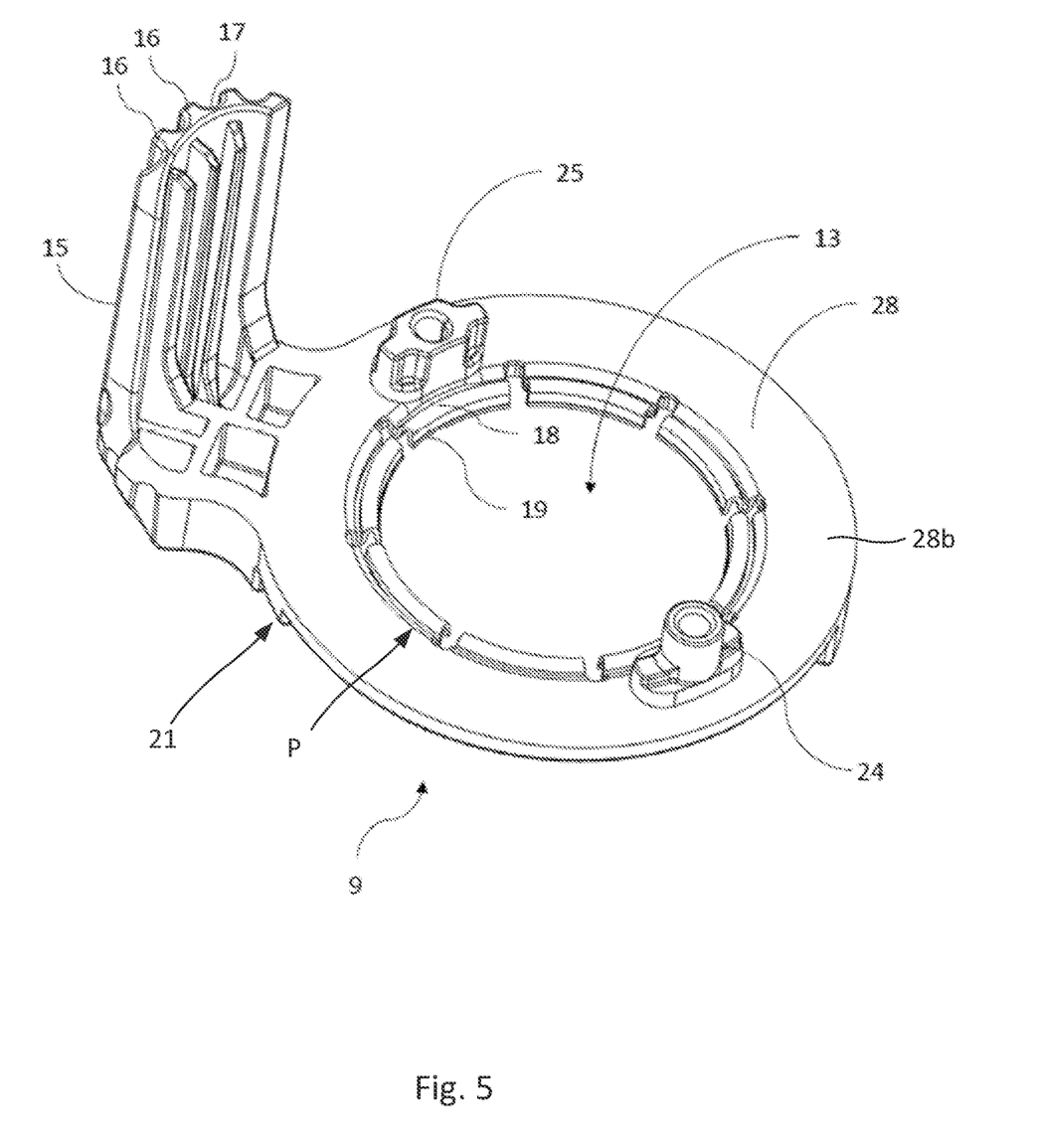
FIG. 5 shows a second isometric view of the operating member of FIG. 3.

In FIGS. 4 and 5 the tool lift control knob 9 is shown separately seen from two different angles. The tool lift control knob 9 is also preferably moulded in one single integral piece. The tool lift control knob 9 has a body 21 including a generally flat wheel part 28. The tool lift control knob 9 has a central aperture 13 in the generally flat wheel part 28 adapted to allow the tool lift control knob 9 to be arranged on the hollow shaft 12 of the first shell-shaped handle housing part 11. The wheel part 28 has opposing surfaces 28a and 28b extending perpendicularly to a rotation axis R and defining a thickness Th of the wheel part 28. An arcuate wall 30 extends from the surface 28a of the wheel part 28. The tool lift knob 9 has a first arm 14 extending radially to provide a lever and a second arm 15 arranged transversely on the first arm 14 so as to reach over the handle housing 3 and be easily accessible by the thumb of the operator. The second arm 15 is preferably provided with surface features such as alternating ribs 16 and grooves 17 for good grip. It could of course also be knurled or have other structures, but from an injection molding viewpoint ribs 16 and groves 17 are currently preferred. As can be seen from FIG. 5, the tool lift control knob 9 has protrusions 24, 25 extending essentially perpendicular to the wheel part 28, e.g. from the surface 28b of the wheel part 28, and adapted of pass through suitably arranged curved slits 26, 27 in the first shell-shaped housing part 11. These protrusions 24, 25 form the connection to the internal kinematic chain of the endoscope from the tool lift control knob 9 to the tool lift 8.

Along the periphery P of the central aperture 13 a braking mechanism for the tool lift control knob 9 is provided. The braking mechanism comprises at least one elastic member 18 adapted for biasing a friction element 19 into a frictional engagement between the hollow shaft 12 arranged on the endoscope handle 3. The hollow shaft 12 itself is stationary as it is preferably integrally formed with the first shell-shaped housing part 11. In practice more than one elastic member 18 and more than one friction element 19 are preferred in order to average out any deviation in friction and keep the wheel part 28 properly centered on the hollow shaft 12, and, as can be seen, the illustrated example has twelve friction elements 19 and a corresponding number of elastic elements 18. Fewer, such as six friction elements 19, is also envisaged as it would reduce the complexity of the tool lift control knob 9. Preferably the number of elastic elements 18 is identical to the number of friction elements 19, but multiples could be used, i.e. more than one elastic element 18 being associated with each friction element 19.

As can be seen, the friction element 19 comprises a curved surface with a curvature adapted to match the curvature of the hollow shaft 12. That is to say, the hollow shaft 12 comprises at least one cylindrical surface part 20 with a radius that matches the curvature of the friction element 19.

The friction elements 19 thus comprise circle sectors with the same radius as the cylindrical surface part 20.

The elastic element 18 comprises a spring which provides a spring bias in the radial direction of the hollow shaft 12 forcing the friction element 19 into a frictional engagement with the cylindrical surface part 20 of the hollow shaft 12.

Figure 6:
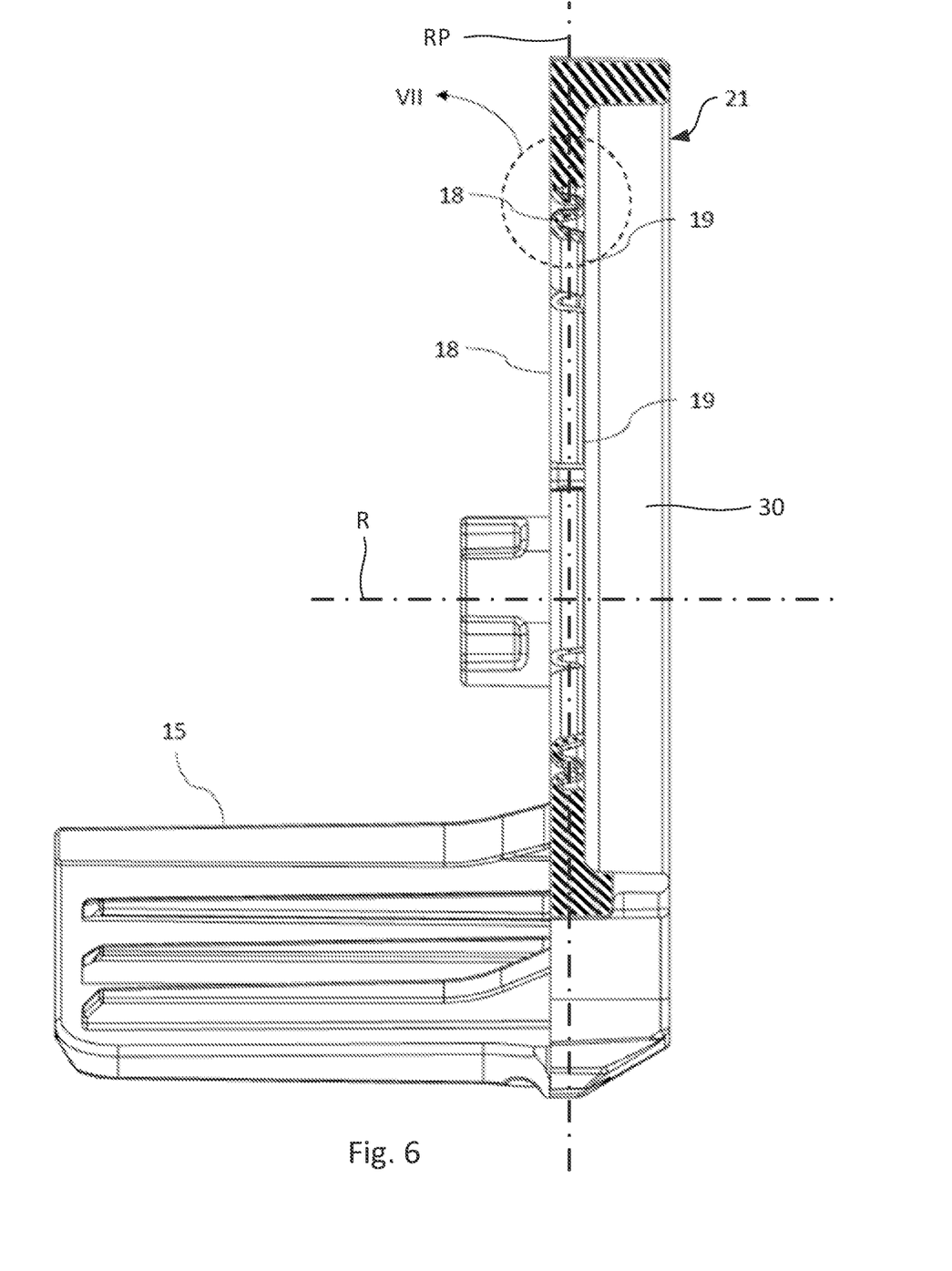
FIG. 6 shows a cross-sectional view of the operating member taken along the line VI-VI in FIG. 5.
Figure 7:
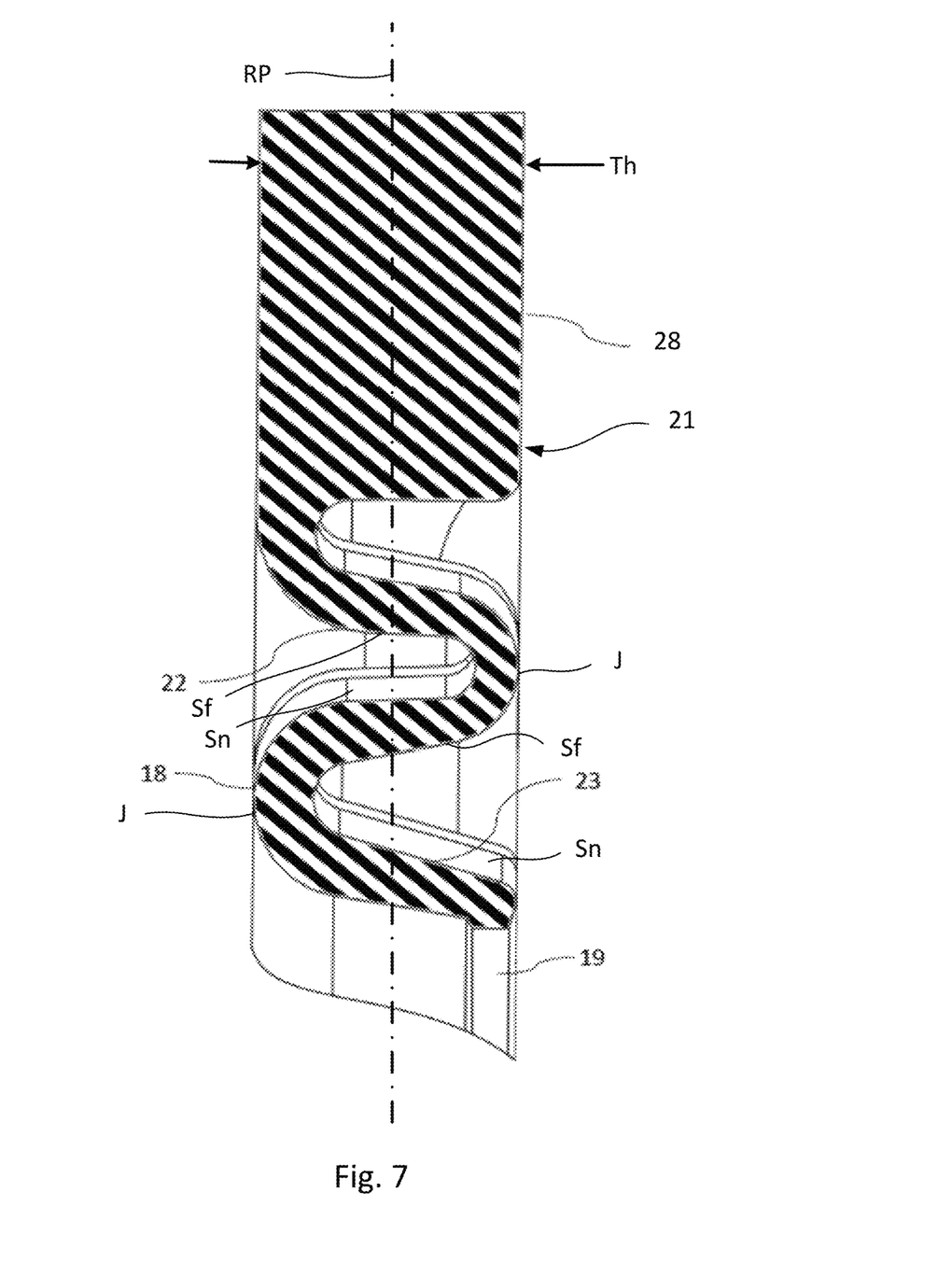
FIG. 7 shows details of the operating member in the circle VII in FIG. 6.

The preferred shape of the elastic element 18 is better seen in the cross-sectional view of the tool lift control knob 9 in FIG. 6 as well as in the more the detailed view of FIG. 7. A rotation plane bisecting the thickness Th of the wheel part 28 is indicated by a dash-dot line designated as RP. Starting to the right-hand side of FIG. 7 is the body 21 of the tool lift control knob 9. From the body 21 the spring extends through a number of U-shaped bends 22, 23 forming together a meander or serpentine shape. In principle a single U-bend 22, 23 would, however, suffice. In the illustrated example there is a first U-bend 22 and a second (inverted) U-bend 23. At the free end of the last U-bend 23 the friction element 19 is provided. The height of the elastic element 18 in the radial direction before assembly is adapted to provide a spring bias. That is to say before assembly the distance between the two curved surfaces of opposing friction elements 19 is smaller than the diameter of the cylindrical surface part 20 of the hollow shaft 12. Thus, when assembled, the cylindrical shaft 12 will compress the spring slightly to provide a bias. At the same time, the friction element 19 which, as can best be seen in FIG. 7, is formed at an angle with respect to the axial direction, will lie flush with the cylindrical surface 20 for optimum engagement over the entire surface of the friction element 19. As shown at least in FIG. 7, each U-shaped bend, or section, may comprise two opposing surfaces and a joint J connecting the two opposing surfaces, the two opposing surfaces comprising a near surface Sn and a far surface Sf, the near surface Sn being positioned between the far surface Sf and the curved surface of the first friction element 19.

Using a spring with such U-bends 22, 23 is advantageous from a manufacturing point of view, as the springs may readily be moulded in a two-part mould without the use of additional cores, inserts or the like.

It should be noted that it would in principle also be possible to arrange the spring and friction elements on the hollow shaft 12. However, as this constitutes a more complex solution in terms of manufacture it is less preferred.

Figure 8:
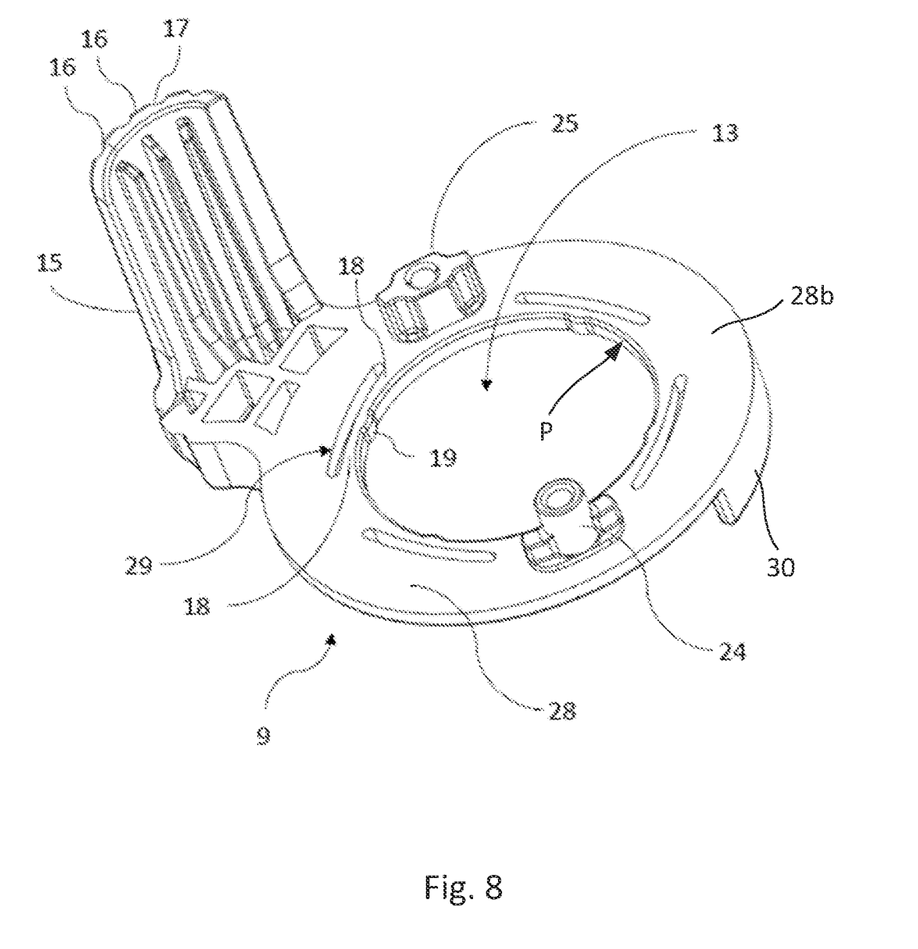
FIG. 8 shows an isometric view of an alternative operating member.

Turning now to FIG. 8 an alternative tool lift control knob 9 is shown. This tool lift control knob 9 also preferably moulded in one single integral piece. The tool lift control knob 9 has a central aperture 13 adapted to allow the tool lift control knob 9 to be arranged on the hollow shaft 12 of the first shell-shaped handle housing part 11. The tool lift knob 9 has a first arm 14 extending radially to provide a lever and a second arm 15 arranged transversely on the first arm 14 so as to reach over the handle housing 3 and be easily accessible by the thumb of the operator. The second arm 15 is preferably provided with surface features such as alternating ribs 16 and grooves 17 for good grip. It could of course also be knurled or have other structures, but from an injection molding viewpoint ribs 16 and groves 17 are currently preferred. As can be seen from FIG. 8, the tool lift control knob 9 has protrusions 24, 25 adapted of pass through suitably arranged curved slits 26, 27 in the first shell-shaped housing part 11. These protrusions 24, 25 form the connection to the internal kinematic chain of the endoscope from the tool lift control knob 9 to the tool lift 8.

Along the periphery of the central aperture 13 a braking mechanism for the tool lift control knob 9 is provided. The braking mechanism comprises at least one elastic member 18 adapted for biasing a friction element 19 into a frictional engagement between the hollow shaft 12 arranged on the endoscope handle 3. In practice more than one elastic member 18 and more than one friction element 19 are preferred, in order to average out any deviation in friction and keep the wheel part 28 properly centered on the hollow shaft 12, and, as can be seen, the illustrated example in FIG. 8 has four friction elements 19 and a corresponding number of elastic elements 18. Fewer, such as six friction elements 19, is also envisaged as it would reduce the complexity of the tool lift control knob 9. Preferably the number of elastic elements 18 is identical to the number of friction elements 19, but multiples could be used, i.e. more than one elastic element 18 being associated with each friction element 19.

As can be seen, the friction element 19 comprises a curved surface in the form of a boss adapted to engage the curvature of the hollow shaft 12. The boss providing the friction element 19 is preferably arrange in the middle of a leaf spring providing the elastic element 18.

The elastic element 18 comprised by the leaf spring is preferably provided by manufacturing a slit 29 in the wheel part 28 of the tool lift control knob 9. The slit 29 is provided directly in the wheel part 28 during the moulding process, where the entire tool lift control knob 9 is integrally moulded in one single piece, but evidently the slit could be cut or punched out in a later stage of the manufacturing process. The inner diameter of elastic element 18 is preferably adapted to match the diameter of the curvature of the hollow shaft 12, so that the inwardly protruding boss forming the friction element 19, is under tension once the toll lift control knob 9 is in place on the hollow shaft 12. The elastic element 18 provided by the slit 29 thus provides the leaf spring with a bias in the radial direction of the hollow shaft 12 forcing the friction element 19 into a frictional engagement with the cylindrical surface part 20 of the hollow shaft 12.

The slit 29 in the wheel part 28 may be straight, wavy or, as shown curved, in particular in the shape of a circle sector. The circle sector is preferably concentric with the central aperture 13 in the wheel part 28 and, when the tool lift control knob 9 is mounted, also concentric with the hollow shaft 12.

The present disclosure thus provides a tool lift control knob 9 incorporating half of the braking mechanism in one single item to be manufactured. Likewise, the shell-shaped housing part 11 incorporates the complementary part of the braking mechanism in one single item to be manufactured.

Needless to say that this braking arrangement and way of providing good tactile feedback to the user is not restricted to use with a tool lift mechanism only, but is applicable to many other control knob and levers as found in various medical devices.

What is claimed is:
1. A medical device comprising:
a medical device housing;
a stationary shaft arranged on the medical device housing;
a rotary operating member rotatably mounted on the stationary shaft and comprising a rotation axis; and
a braking mechanism for the rotary operating member, the braking mechanism comprising:
a first friction element comprising a curved surface; and
an elastic member adapted for biasing the first friction element into a frictional engagement between the stationary shaft and the rotary operating member,
wherein said elastic member comprises a spring which, as seen in a cross-section taken along a radial plane encompassing the rotation axis of the rotary operating member, has a cross-sectional shape with at least one U-shaped section configured to provide a radial tension.

2. The medical device of claim 1, wherein said elastic member is provided integrally with said rotary operating member.

3. The medical device of claim 2, wherein said curved surface of said first friction element comprises a circle sector with a predetermined radius.

4. The medical device of claim 3, wherein said curved surface is configured to match a cylindrical surface of said stationary shaft.

5. The medical device of claim 1, wherein said braking mechanism further comprises a second friction element.

6. The medical device of claim 1, further comprising additional friction elements and additional elastic members, each of the additional friction elements comprising a curved surface, wherein each of the additional friction members is connected to a respective one of the additional elastic members, and wherein the elastic member, the additional elastic members, the first friction element and the additional friction elements are molded in a one-piece part with the rotary operating member.

7. The medical device of claim 6, wherein the medical device is an endoscope.

8. The medical device of claim 7, wherein the medical device housing comprises a handle of the endoscope.

9. A system comprising the medical device of claim 8 and a display unit.

10. The medical device of claim 1, wherein the at least one U-shaped section of the cross-sectional shape of the spring comprises a first U-shaped section comprising two opposing surfaces and a joint connecting the two opposing surfaces, the two opposing surfaces comprising a near surface and a far surface, the near surface being positioned between the far surface and the curved surface of the first friction element.

11. The medical device of claim 10, wherein the at least one U-shaped section of the cross-sectional shape of the spring comprises a second U-shaped section comprising two opposing surfaces and a joint connecting the two opposing surfaces, the two opposing surfaces comprising a near surface and a far surface, the near surface being positioned between the far surface and the curved surface of the first friction element, and wherein the second U-shaped section is inverted relative to the first U-shaped section.

12. The medical device of claim 1, wherein the rotary operating member includes a wheel part and the braking mechanism provided integrally as one part, the wheel part including a central aperture with the stationary shaft passing through the central aperture.

13. The medical device of claim 1, wherein the rotary operating member includes a wheel part and the braking mechanism provided integrally as one part, the wheel part including a central aperture with the stationary shaft passing through the central aperture, wherein the at least one U-shaped section of the cross-sectional shape of the spring comprises a first U-shaped section comprising two opposing surfaces and a joint connecting the two opposing surfaces, the two opposing surfaces comprising a near surface and a far surface, the near surface being positioned between the far surface and the curved surface of the first friction element.

14. The medical device of claim 1, wherein the at least one U-shaped section of the cross-sectional shape of the spring comprises a first U-shaped section and a second U-shaped section connected to the first U-shaped section, the second U-shaped section being inverted relative to the first U-shaped section.

\* \* \* \* \*